P. H. VAUGHN.
FEED ROLLER.
APPLICATION FILED DEC. 20, 1919.
1,423,783. Patented July 25, 1922.
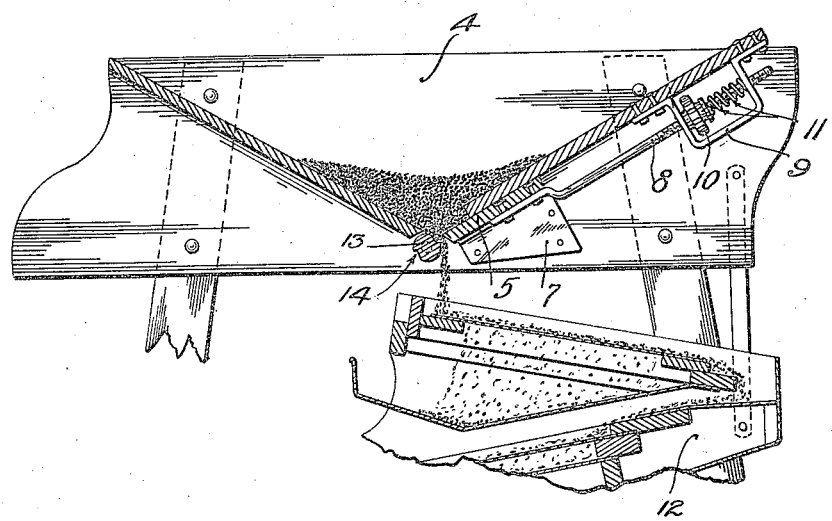
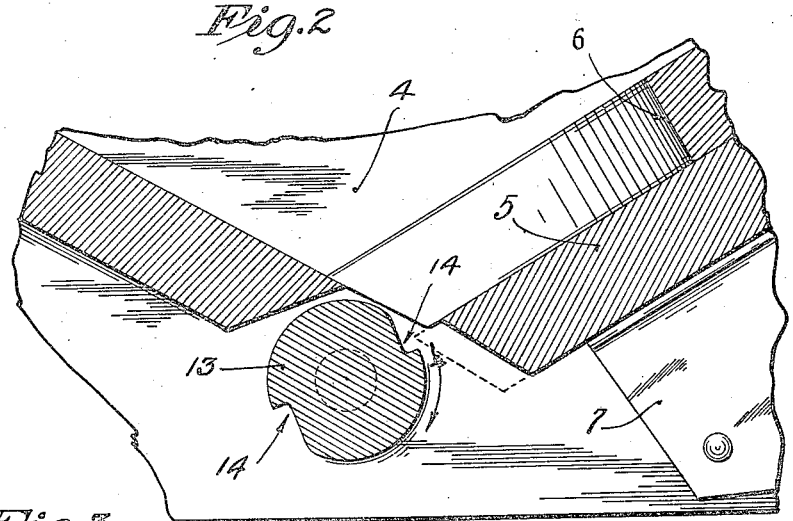
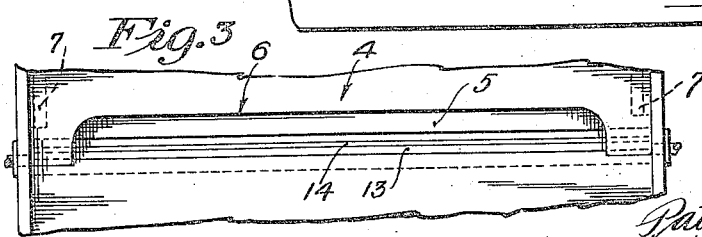
Inventor
Patrick H. Vaughn
By his Attorneys
Williamson Burcham

UNITED STATES PATENT OFFICE.

PATRICK H. VAUGHN, OF MORRIS, MINNESOTA.

FEED ROLLER.

1,423,783.

Specification of Letters Patent. Patented July 25, 1922.

Application filed December 20, 1919. Serial No. 346,326.

*To all whom it may concern:*

Be it known that I, PATRICK H. VAUGHN, a citizen of the United States, residing at Morris, in the county of Stevens and State of Minnesota, have invented certain new and useful Improvements in Feed Rollers; and I do hereby declare the following to be a full, clear, and exact description of the invention, such as will enable others skilled in the art to which it appertains to make and use the same.

My invention relates to devices for feeding grain and various other materials from hoppers to sieves or the like, and is particularly directed to the provision of an improved form of feed roller, which, while highly efficient and positive in its feeding action, will not crush the grain or other material that is being fed thereby.

Generally stated, the invention consists of the novel devices and combinations of devices hereinafter described and defined in the claims.

The invention will be found particularly serviceable for use in fanning mills or grain separators, and in the accompanying drawings is illustrated as thus applied and used.

In the accompanying drawings, which illustrate the invention, like characters indicate like parts throughout the several views.

Referring to the drawings:—

Fig. 1 is a vertical section showing the hopper and certain of the sieves of a fanning mill or grain separator and illustrating my invention incorporated therein;

Fig. 2 is an enlarged fragmentary section on the same line as Fig. 1, showing the said roller on a larger scale and showing immediately co-operating portions of the hopper; and Fig. 3 is a fragmentary plan view showing a portion of the bottom of the hopper and a portion of the adjustable feed gate.

Of the parts of the fanning mill illustrated, the numeral 4 indicates a feed hopper provided in its bottom with a transverse discharge passage that is adapted to be opened and closed, to a greater or less extent, by a sliding gate 5 in the form of a flat plate 5. The lower edge of the overlying bottom plate 4' of the hopper is cut away at 6 to form a long notch that extends over the delivery edge of the gate 5, but which extends less than from end to end thereof, as best shown in Fig. 3.

The gate 5, as shown, is guided for sliding movements on angular brackets 7 secured to the side plates of the hopper 4 below the bottom of the hopper. For adjusting the gate 5, it is provided with an extended rod 8, the threaded end of which works loosely through perforations in an angular bracket 9 secured to the bottom plate 4'. A nut 10 works with threaded engagement on the threaded end of the rod 8 within the bracket 9 and a coiled spring 11, encircling said rod, re-acts against the nut 10 and against the outer portion of the bracket 9. Preferably, as shown, a washer on the rod 8 is interposed between the nut 10 and adjacent end of the spring 11. The spring 11 will, under certain conditions hereinafter noted, yield and permit the gate 5 to be forced toward an extreme open position.

Located below the hopper in a position to receive the grain therefrom, is a vibratory shoe 12 of the usual or any suitable construction and arrangement.

My improved feed roller 13 is located so that it works just below the discharge passage in the bottom of the hopper 4 and where it will prevent discharge of grain from the hopper when the roller is idle and the gate 5 is moved close to the same. This roller, by any suitable or well known means, will be driven in the direction of the arrow marked adjacent thereto in Figure 2, and, in accordance with my invention, said roller is provided with ratchet-like longitudinal feed grooves 14, the circumferentially oblique bottoms of which extend backward in respect to the direction of rotation of the roller and blend into the periphery of the roller for a highly important purpose presently to be described.

It is important to note that the upper face of the gate 5, at its feed edge, is nearest to the periphery of the feed roller 13 and is beveled downward and backward therefrom.

By this construction, any materials that can pass between the feed gate and feed roller will be immediately released, owing to the diverging relation of said gate and roller in respect to each other, thus preventing materials to be separated from being held in a pocket where they might be crushed or broken between the feed roller and feed gate, and it also prevents said materials from clogging or piling up at the feed opening. It is also important to note that the feed edge of the gate 5 is spaced apart from the feed roller 13 to cause a constant and even feed from the hopper, and this opening may be varied, at will, by manipulating the nut 10 to radially adjust said gate toward or from the feed roller.

As the grooves 14 come opposite the feed edge of the gate 5, during the rotation of the feed roller 13, the size of the feed opening is materially increased for an instant to permit any large, foreign matter, such as sticks, straws, wild rose seed pods, and the like, which may have accumulated at the feed opening, to ride therethrough on the shoulder of the respective groove 14 and then be precipitated therefrom under the rotation of the feed roller 13. It will thus be seen that the feed opening is intermittently cleared to prevent an accumulation of large, foreign materials which would interfere with a constant and even feed of materials from the hopper through the feed opening throughout the operative length of the feed roller. This intermittent clearing of the feed opening and the action of the feed roller 13, due to its uneven periphery, produced by the grooves 14, on the overlying mass of material in the hopper, will agitate said material and prevent a mixture, such as wild oats, from matting or arching over the feed opening.

By having the upper face of the gate 5 at its feed edge nearest to the feed roller 13, coarse grain mixtures, such as corn, speltz, beans or peas, passing through the feed opening, will positively not be crushed or cracked, neither will smaller grains, such as wheat or barley, be crushed or cracked when the feed gate 5 is nearly closed to shut down the capacity of the feed roller during difficult separations. As the grooves 14 move away or downward from the feed gate 5, the bottoms thereof, as they blend into the periphery of the feed roller 13, will gradually reduce the width of the feed opening to its minimum set width so that when said grooves move away from the feed edge of said gate, the constant feed of the materials between the roller and gate is not disturbed by the clearing of said opening. The blending of the grooves 14 into the periphery of the feed roller 13, in an opposite direction to the rotation of said roller, eliminates all abrupt shoulders or edges that would positively hold the materials to be separated and thereby cause the same to be crushed or cracked between the feed roller and feed gate.

In case a stone or other hard object enters one of the grooves 14 and is too large to pass through the feed opening at its maximum set width, the yieldingly held feed gate 5 will be pressed backward against the tension of the spring 11 to permit the feed roller to carry said object from the hopper without breaking or damaging the feed edge of said gate or straining any of the parts of either said roller or gate.

The feed roller and yielding gate cooperate to produce a highly efficient feed device especially adapted to the feeding of grain, but will be found useful in feeding various other materials. In commercial use, the improved feed roller has proven highly efficient for the purpose had in view.

What I claim is:—

1. In a grain feeding device comprising a hopper having converging sides with an opening therebetween at their lower and adjacent ends, a feed roller having a smooth feeding surface interrupted by spaced pockets therein comprising a radial side and a side extending substantially normal thereto rearwardly to the smooth surface, the ends of the hopper sides being beveled backwardly at an acute angle to their inside surface and the roller being disposed therebetween to leave a constant open space between the same and the smooth surface of the roller through which the material is fed which space is enlarged when the pockets come into alinement with the edges of the hopper sides.

2. A hopper having an inclined side with its lower edge beveled rearwardly and forming the edge of the discharge opening therein, said side being yieldable and adjustable longitudinally and a feed roller having a smooth surface spaced from the edge of said side to provide a feed opening, said roller having a longitudinally extending pocket therein with an advanced wall that is approximately radial and another wall that extends gradually rearwardly therefrom to the smooth surface of the roller.

3. A feeding device having in combination, a hopper having downwardly converging side walls spaced at their lower edges, a rotatable feeding roller disposed between, parallel to and spaced from said edges, the axis of said roller being in alinement with the inner surface of the hopper side toward which it rotates, said roller having therein spaced longitudinally extending pockets, the advance walls of which are substantially radial and the bottoms of which extends rearwardly and substantially normal to said walls.

4. A feeding device having in combination, a hopper having converging walls spaced apart at their lower edges and a rotatable feeding roller disposed between and parallel to and spaced from said edges to provide a feed opening, said roller having spaced longitudinal pockets therein, said pockets having their advance walls substantially radial and their bottom surfaces extending rearwardly, substantially normal to said walls.

In testimony whereof I affix my signature in presence of two witnesses.

PATRICK H. VAUGHN.

Witnesses:
WINIFRED I. WARD,
HARRY D. KILGORE.